(12) United States Patent
Iwanaga et al.

(10) Patent No.: US 8,231,737 B2
(45) Date of Patent: Jul. 31, 2012

(54) DISH WASHER/DRYER

(75) Inventors: Shigeru Iwanaga, Nara (JP); Tsuyoshi Inada, Osaka (JP); Keiji Ishikawa, Hyogo (JP); Noriyoshi Matoba, Osaka (JP)

(73) Assignee: Panasonic Corporation, Osaka (JP)

( * ) Notice: Subject to any disclaimer, the term of this patent is extended or adjusted under 35 U.S.C. 154(b) by 578 days.

(21) Appl. No.: 12/062,942

(22) Filed: Apr. 4, 2008

(65) Prior Publication Data

US 2009/0095330 A1    Apr. 16, 2009

(30) Foreign Application Priority Data

Oct. 11, 2007 (JP) ................... 2007-265153
Jan. 29, 2008 (JP) ................... 2008-017754

(51) Int. Cl.
*B08B 3/00* (2006.01)
(52) U.S. Cl. ............ 134/56 D; 134/57 D; 312/213
(58) Field of Classification Search .......... None
See application file for complete search history.

(56) References Cited

U.S. PATENT DOCUMENTS

| | | | |
|---|---|---|---|
| 3,026,628 A | | 3/1962 | Berger, Sr. et al. |
| 4,247,158 A | * | 1/1981 | Quayle .......... 312/213 |
| 4,716,818 A | * | 1/1988 | Brown .......... 454/286 |
| 2003/0233843 A1 | * | 12/2003 | Ueda .......... 62/408 |

FOREIGN PATENT DOCUMENTS

| | | |
|---|---|---|
| DE | 34 18 304 A1 | 11/1985 |
| EP | 0 374 616 A1 | 6/1990 |
| EP | 1 127 532 A2 | 8/2001 |
| EP | 1 142 528 A2 | 10/2001 |
| EP | 1 426 604 A2 | 6/2004 |
| EP | 1 498 647 A1 | 1/2005 |
| EP | 1 721 599 A | 11/2006 |
| FR | 2 523 430 A | 9/1983 |
| JP | 2-92327 A | 4/1990 |
| JP | 3-143419 A | 6/1991 |
| JP | 3-289924 A | 12/1991 |
| JP | 9-285437 A | 11/1997 |
| JP | 2000-166847 A | 6/2000 |
| JP | 2003-304995 A | 10/2003 |

OTHER PUBLICATIONS

Steck, Wolfgang, Sep. 1983, FR2523430, English machine translation.*
European Search Report for Application No. EP 08 15 4047 dated Sep. 22, 2008.

* cited by examiner

*Primary Examiner* — Michael Barr
*Assistant Examiner* — Jason Ko
(74) *Attorney, Agent, or Firm* — RatnerPrestia

(57) ABSTRACT

A dish washer/dryer includes a washing tub for accommodating an object to be washed, a washing section for washing the object to be washed, a heater for heating washing water, an exhaust port for discharging moisture inside the washing tub, an air blower for blowing outside-air, a mixing section disposed at an upstream side of the exhaust port and mixing the outside-air with washing-tub-inside-air, and an air volume distribution section for changing the feeding ratio of outside-air into the washing tub and the mixing section. This configuration provides a dish washer/dryer, in which a sufficient amount of outside-air is mixed with exhaust air in the washing tub so as to promote the temperature reduction of the exhaust air and the reduction of the moisture content in the exhaust air during drying operation, thereby enhancing the comfort of the exhaust air.

14 Claims, 10 Drawing Sheets

DISH WASHER/DRYER

BACKGROUND OF THE INVENTION

1. Field of the Invention

The present invention relates to a dish washer/dryer which is installed in a kitchen and the like and which accommodates, automatically washes and dries an object to be washed.

2. Background Art

Conventionally, this kind of dish washer/dryer has a configuration in which in order to dry an object to be washed after washing is completed, outside-air is blown into a washing tub and high-temperature and high-humidity air in the washing tub is discharged as disclosed in, for example, Japanese Patent Application Unexamined Publication No. 2000-166847.

FIG. 10 shows a conventional dish washer/dryer described in the above-mentioned document. As shown in FIG. 10, the dish washer/dryer includes washing tub 501 for accommodating an object to be washed; washing section 504; heater 505 for heating washing water; air blower 506 for blowing outside-air to washing tub 501; exhaust port 507 for exhausting air inside washing tub 501; and exhausting assisting section 508, which is provided at exhaust port 507, for mixing outside-air. Note here that washing section 504 includes washing nozzle 502 for spraying washing water and washing pump 503 for pressurizing washing water.

However, in the above-mentioned conventional configuration, new outside-air as a side stream is mixed with exhaust air by fluid force of high-temperature and high-humidity mainstream air flowing into exhaust port 507. Therefore, although the temperature of the high-temperature and high-humidity exhaust air in washing tub 501 can be reduced, the air volume is not enough to cool sufficiently so as to avoid a hot air feeling of the exhausted air.

SUMMARY OF THE INVENTION

A dish washer/dryer of the present invention has the following configuration. The dish washer/dryer of the present invention includes a washing tub for accommodating an object to be washed, a washing section for washing the object to be washed, and a heater for heating washing water. Furthermore, the dish washer/dryer includes an exhaust port for discharging moisture inside the washing tub; an air blower for blowing outside-air; a mixing section, which is disposed at an upstream side of the exhaust port, for mixing outside-air and washing-tub-inside-air with each other; and an air volume distribution section for changing a feeding ratio of the outside-air into the washing tub and the mixing section.

With this configuration, during drying operation, it is possible to freely set the distribution ratio of the flow amount of outside-air flowing in the mixing section to washing-tub-inside-air. Therefore, by reducing the temperature and humidity of exhaust air, reliable prevention of a hot air feeling and an improvement of drying performance can be realized.

It is possible to provide a dish washer/dryer in which a sufficient amount of outside-air is mixed with exhaust air inside the washing tub flown from the washing tub during drying operation so as to promote the temperature reduction of the exhaust air and the reduction of moisture content in the exhaust air, thereby enhancing the comfort of the exhaust air.

DETAILED DESCRIPTION OF THE INVENTION

Hereinafter, the embodiments of the present invention are described with reference to drawings. Note here that the present invention is not limited by these embodiments.

First Embodiment

Figure 1:
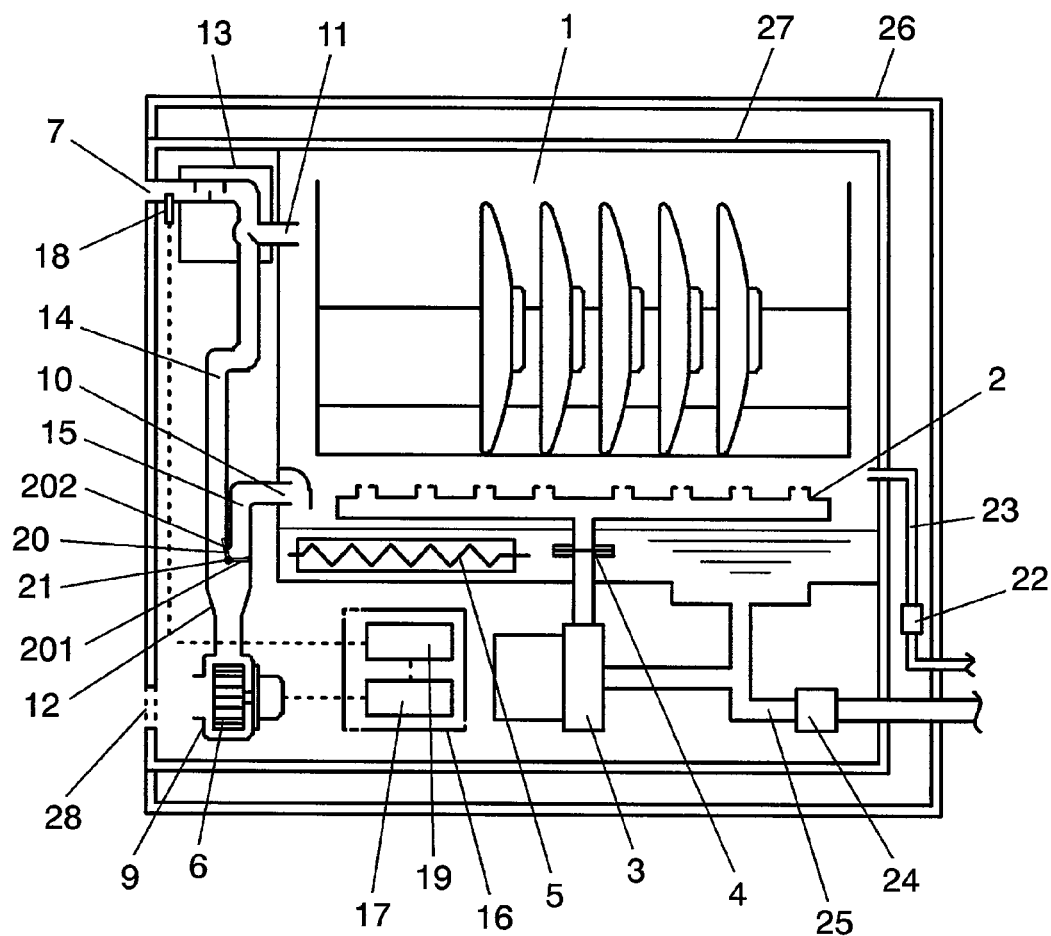
FIG. 1 is a view showing a configuration of a dish washer/dryer in accordance with a first embodiment of the present invention.
Figure 2:
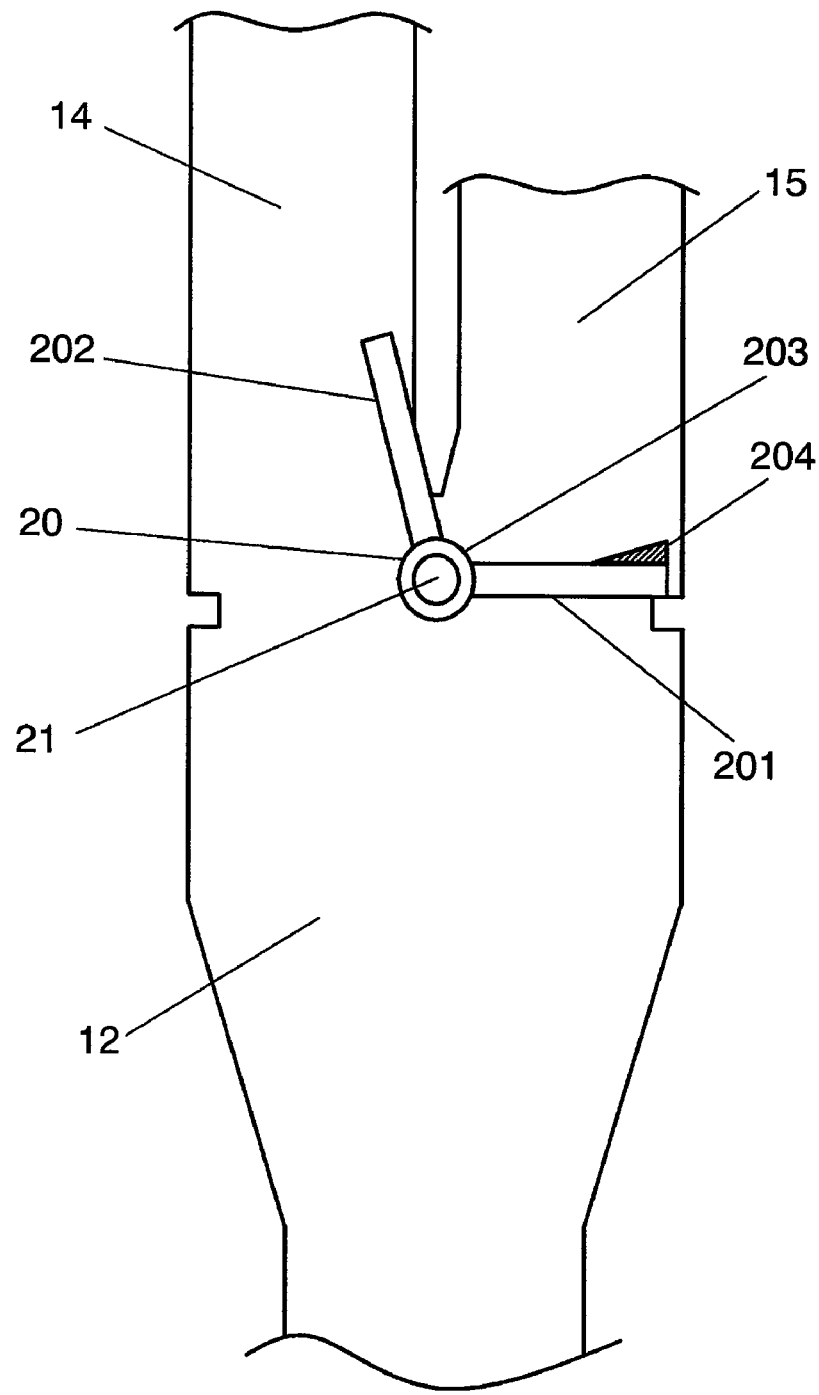
FIG. 2 is a sectional view showing an air volume distribution section of the dish washer/dryer shown in FIG. 1.
Figure 3:
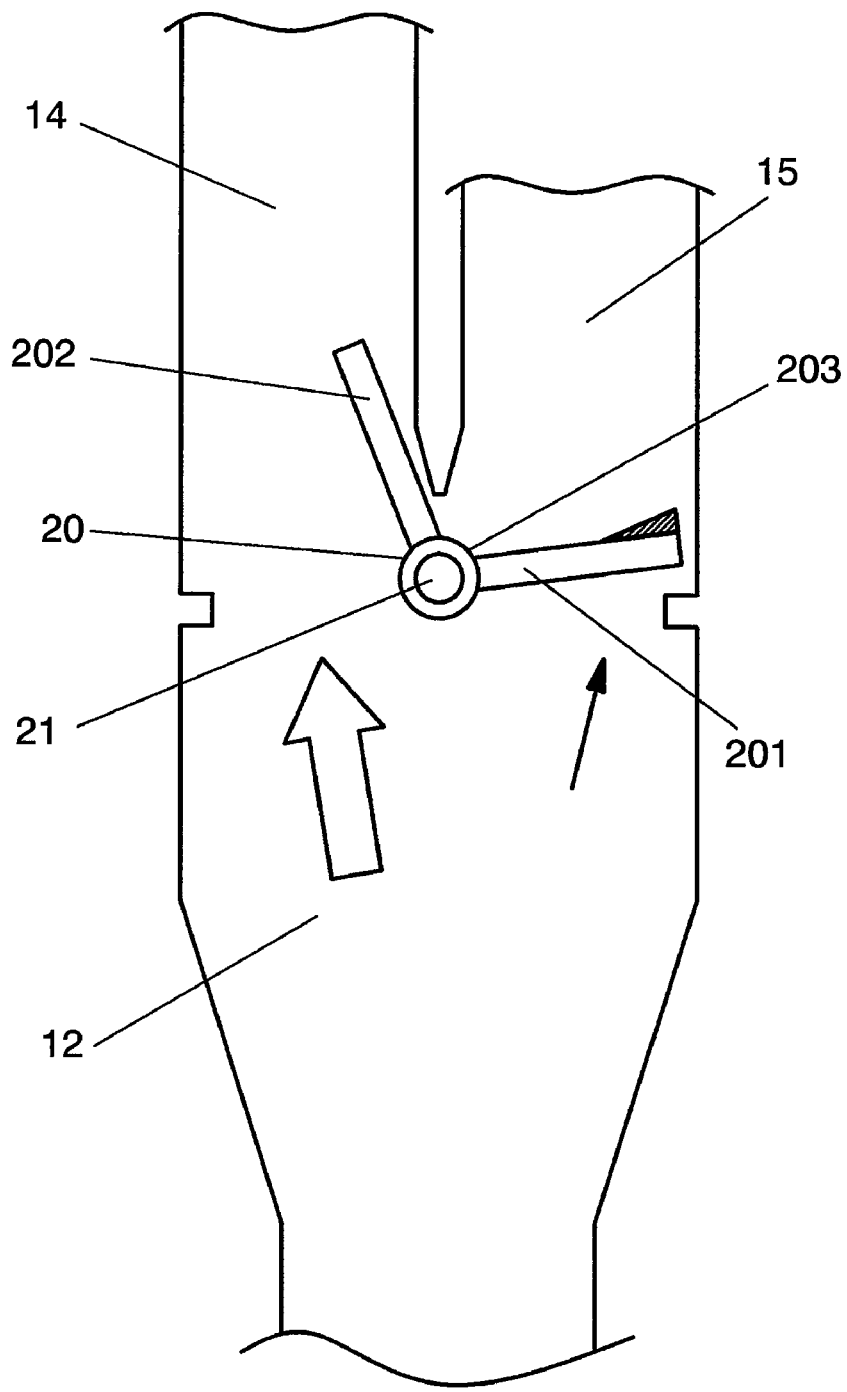
FIG. 3 is a sectional view showing another state of the air volume distribution section shown in FIG. 2.
Figure 4:
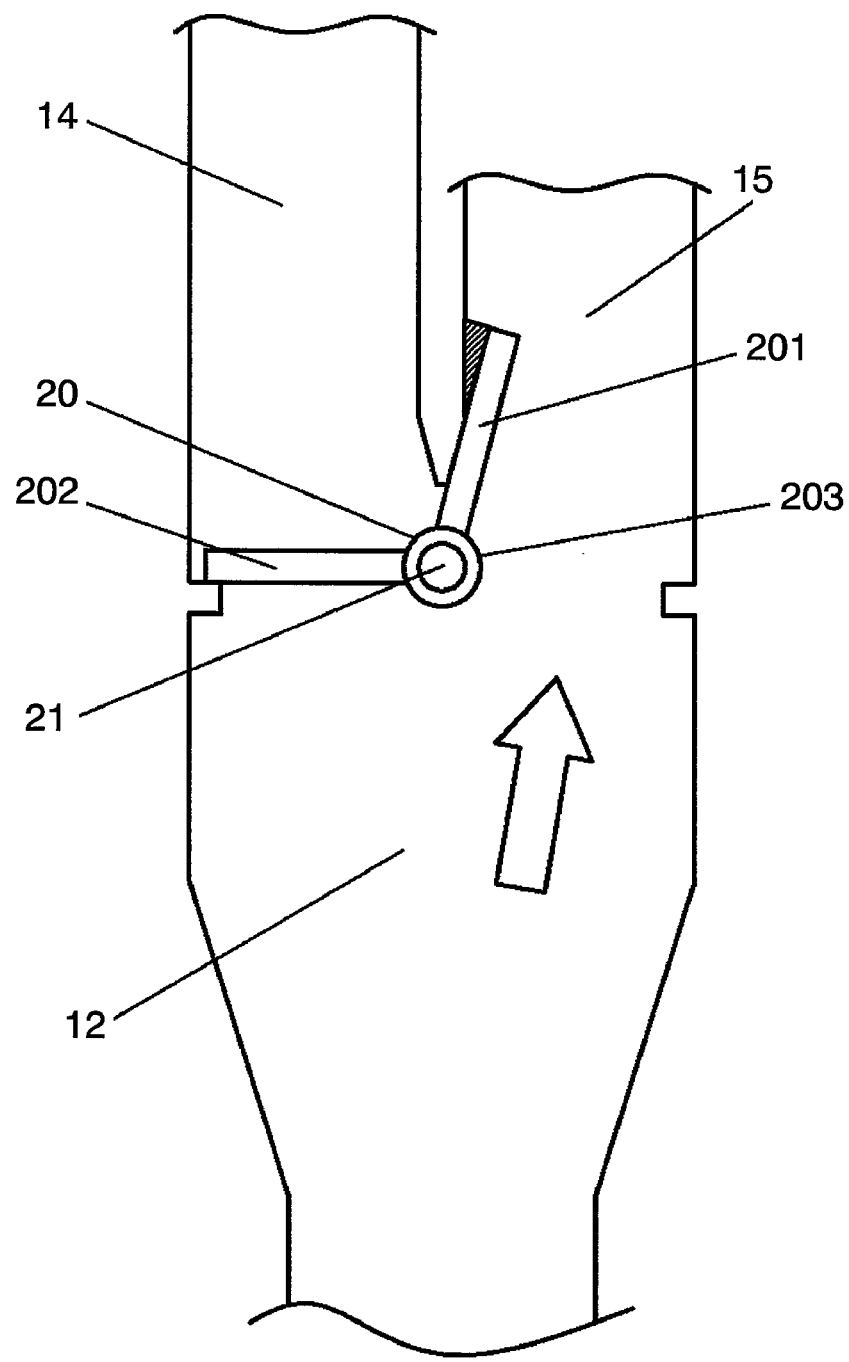
FIG. 4 is a sectional view showing a further state of the air volume distribution section shown in FIG. 2.
Figure 5:
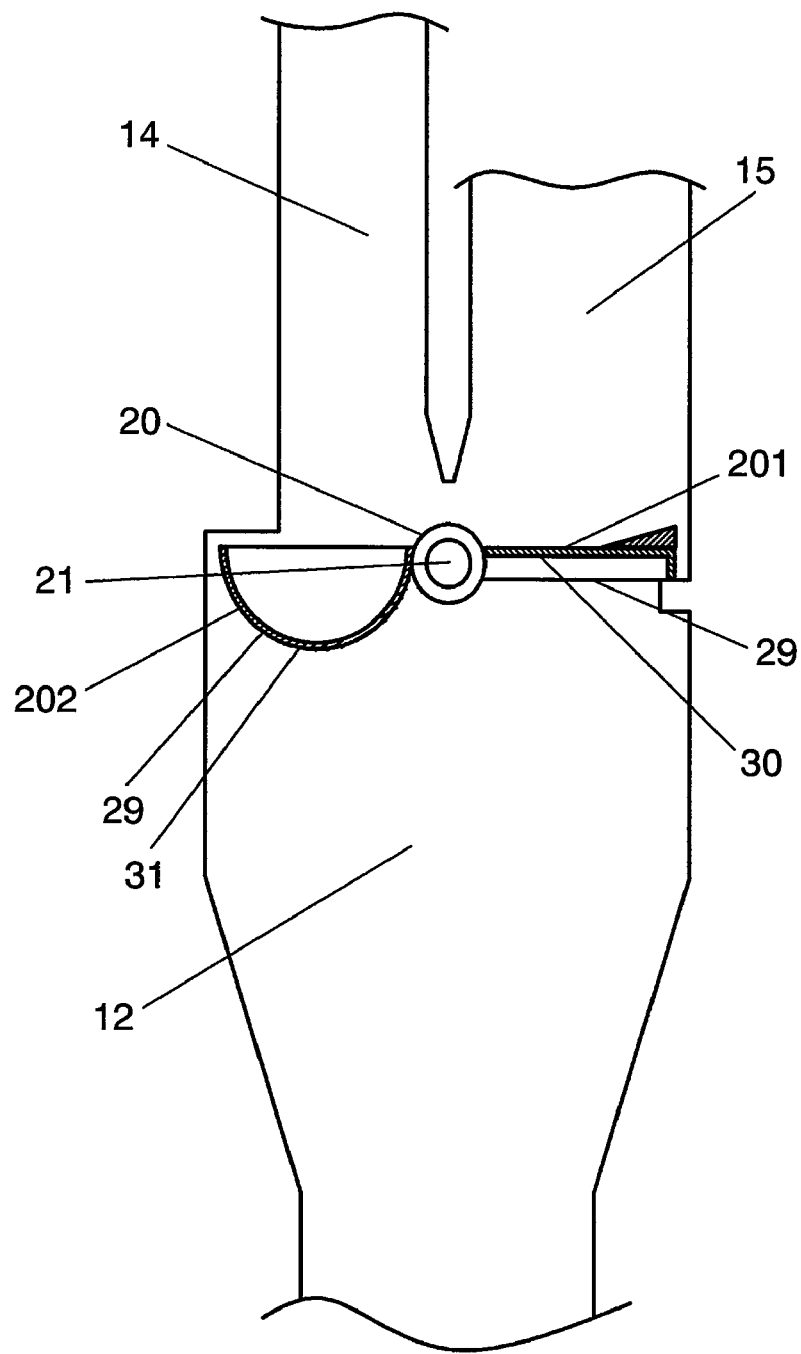
FIG. 5 is a sectional view showing another configuration of a damper in the air volume distribution section.
Figure 6:
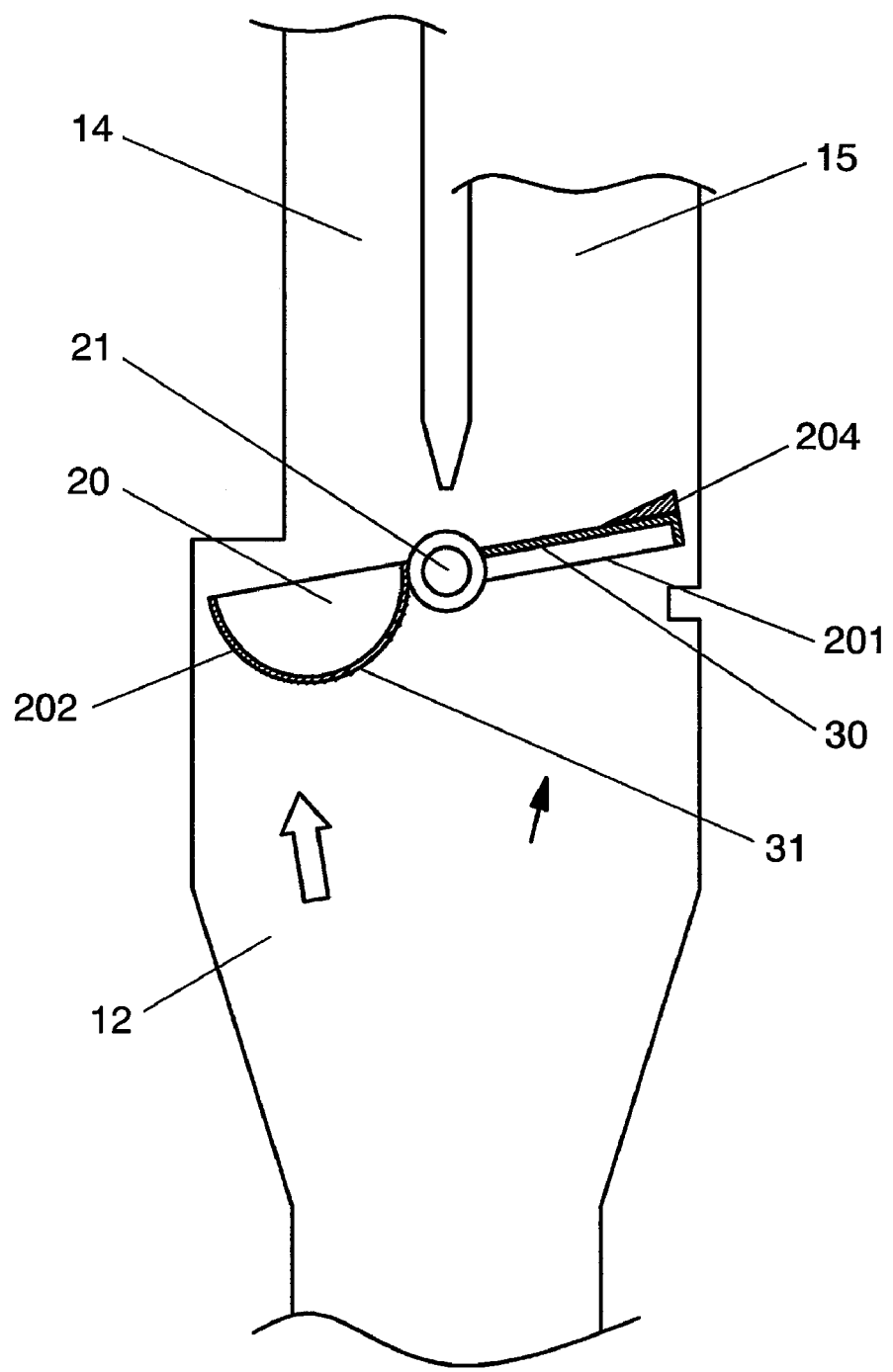
FIG. 6 is a sectional view showing another state of the damper shown in FIG. 5.

FIG. 1 is a view showing a configuration of a dish washer/dryer in accordance with a first embodiment of the present invention. FIG. 2 is a sectional view showing an air volume distribution section in the dish washer/dryer shown in FIG. 1. FIG. 3 is a sectional view showing another state of the air volume distribution section shown in FIG. 2. FIG. 4 is a sectional view showing a further state of the air volume distribution section shown in FIG. 2 FIG. 5 is a sectional view showing another configuration of a damper in the air volume distribution section. FIG. 6 is a sectional view showing another state of the damper shown in FIG. 5.

Firstly, with reference to FIG. 1, a main configuration of a dish washer/dryer in accordance with the first embodiment is described. The dish washer/dryer of the first embodiment includes washing tub 1 for accommodating an object to be washed, washing section 4 for washing the object to be washed, and heater 5 for heating washing water. Furthermore, the dish washer/dryer includes exhaust port 7 for discharging moisture inside washing tub 1, air blower 6 for blowing outside-air, mixing section 13 disposed at an upstream side of exhaust port 7 and mixing outside-air with inside air in washing tub 1, and air volume distribution section 12 for changing a feeding ratio of the outside-air into washing tub 1 and mixing section 13.

Next, with reference to FIG. 1, the dish washer/dryer of the first embodiment is described in more detail.

In FIG. 1, washing section 4 and heater 5 for heating washing water are disposed below washing tub 1 for accommodating an object to be washed such as dishes. Washing section 4 includes washing nozzle 2 for spraying washing water to the object to be washed and allowing the washing water to circulate, and washing pump 3 for pressurizing the washing water. Furthermore, drying section 9 includes air blower 6 for blowing outside-air in order to discharge moisture inside washing tub 1 and to dry the inside of washing tub 1, and exhaust port 7 for discharging moisture inside washing tub 1. Furthermore, washing tub 1 has inflow port 10 for allowing outside-air to flow in the lower part thereof. Washing tub 1 has outlet port 11 for discharging air in washing tub 1 (washing-tub-inside-air) at the upper part thereof. A downstream side of air blower 6, air volume distribution section 12 for distributing air volume is coupled. Outside-air path 14 for introducing outside-air into mixing section 13 and washing-tub-inside-air path 15 that communicates to mixing section 13 via inflow port 10, washing tub 1 and output port 11 of washing tub 1 are disposed at a downstream side of air volume distribution section 12. Furthermore, mixing section 13 has an output side communicating to exhaust port 7 and an input side communicating to outside-air path 14 and outlet port 11 that is washing-tub-inside-air path 15. In this way, air blower 6 is disposed at an upstream side of air volume distribution section 12, and mixing section 13 for mixing outside-air and washing-tub-inside-air with each other is disposed at an upstream side of exhaust port 7.

Air volume distribution section 12 distributes the air volume by changing flow resistance to outside-air path 14 and washing-tub-inside-air path 15, and changes the flow ratio of the outside-air in mixing section 13 to the inside air in washing tub 1 at the time of mixing.

Control section 16 controls drying section 9 and has air volume control section 17 for controlling the air volume of air blower 6 and temperature control section 19 for setting a control amount based on the detected temperature by temperature detection section 18 provided at a downstream side of mixing section 13.

Furthermore, air volume distribution section 12 distributes the air volume of air blower 6 into outside-air path 14 and washing-tub-inside-air path 15. In order to do so, as shown in FIG. 2, damper 20, whose opening degree is changed by a wind pressure generated by the operation of air blower 6, is provided in a way in which it faces outside-air path 14 and washing-tub-inside-air path 15, respectively. Washing tub damper 201 provided at the side of washing-tub-inside-air path 15 and outside-air damper 202 provided at the side of outside-air path 14 are linked and integrated with each other as connected body 203.

Damper 20 is in a connection posture in which when the opening degree of washing tub damper 201 is increased, the opening degree of outside-air damper 202 is reduced. Weight 204 is added to washing tub damper 201 of this integrated damper 20 so that damper 20 is freely rotatable on support shaft 21. Thus, when the wind pressure of air blower 6 is lower than a predetermined value or the operation of air blower 6 stops, damper 20 substantially closes or blocks the side of washing-tub-inside-air path 15 and fully opens the side of outside-air path 14 as shown in FIG. 2.

Furthermore, in FIG. 1, water feed pipe 23, provided with feed valve 22 for feeding washing water, and drain pipe 25, provided with drain valve 24 for draining washing water are connected to washing tub 1. Washing tub 1 is accommodated in slide 27 that can be drawn out from case 26. Slide 27 is provided with vent hole 28 communicating to the outside.

Hereinafter, operations and effects of the thus configured dish washer/dryer are described.

In FIG. 1, firstly, slide 27 is drawn out from case 26 and objects to be washed such as dishes are placed in washing tub 1, then slide 27 is returned to the original position, and washing is started. At the time when washing operation is started, feed valve 22 is opened and water is fed from water feed pipe 23 to washing tub 1. When a predetermined amount of water is fed, feed valve 22 is closed so as to stop the feeding of water. Next, hot water is ejected from washing nozzle 2 by operating heater 5 and washing pump 3 as washing section 4 so as to be sprayed onto dishes as objects to be washed and allowed to circulate. When washing nozzle 2 is rotated by a reaction force generated by spraying washing water, the washing water is spread to the objects to be washed to enhance the washing performance. Herein, the case in which washing is carried out with hot water by operating heater 5 is described. However, when the objects to be washed are not so dirty, they may be washed with washing water at a temperature of the fed water without operating heater 5. Furthermore, when objects to be washed are so dirty, they may be washed with washing water containing a detergent. When the washing operation is completed, drain valve 24 is opened and the washing water is drained from drain pipe 25 to the outside of case 26. When draining is finished, drain valve 24 is closed.

In the following rinsing operation, similar to the washing operation, water without containing a detergent is fed. By operating heater 5 and washing pump 3, hot water is ejected from washing nozzle 2 so as to be sprayed onto dishes as objects to be washed and allowed to circulate. It is preferable that the objects to be washed are warmed in the rinsing operation for a drying operation for drying the objects to be washed, which is carried out after this rinsing operation. When the rinsing operation is carried out by using high-temperature hot water of about 70° C. to 80° C., disinfecting treatment can be carried out. After the rinsing operation is completed, similar to the time when the washing operation is completed, the rinsing water in washing tub 1 is drained out.

In the following drying operation, air in washing tub 1, which has become a high-temperature and high-humidity state by the rinsing operation, is discharged and the objects to be washed are dried. In order to do so, in addition to the operation of air blower 6, air volume distribution section 12 distributes air into outside-air path 14 and washing-tub-inside-air path 15, so that outside-air is forwarded to mixing section 13 and washing tub 1. In particular, when the rinsing operation is carried out with high-temperature hot water, high-temperature and high-humidity air in washing tub 1 is prevented from being directly discharged from exhaust port 7. That is to say, when the drying operation is started, the blowing air volume of air blower 6 is reduced by air volume control section B17 and a low wind pressure is applied to air volume distribution section 12 so as to blow air mainly to the side of outside-air path 14. Then, by approaching the air volume ratio of the outside-air to the washing-tub-inside-air (outside-air volume: washing-tub-inside-air volume) to be about 1:0, the air blown from air blower 6 is mainly directed toward cooling. By cooling an exhaust air path whose temperature has been raised during a high temperature rinsing operation, hot air is prevented from being discharged from exhaust port 7.

Next, the blowing air volume of air blower 6 is a little bit increased and a wind pressure applied to damper 20 of air volume distribution section 12 is increased so as to slightly open washing tub damper 201 as shown in FIG. 3. Thus, a small amount of air (shown by a black arrow in FIG. 3) is distributed to flow into the side of washing-tub-inside-air path 15 and the most amount of air (shown by a blanked arrow in FIG. 3) is distributed to flow into the side of outside-air path 14. In mixing section 13, the high-temperature and high-humidity air pushed out from washing tub 1 by the air entering the side of washing-tub-inside-air path 15 is mixed with a large amount of air entering the side of outside-air path 14 and cooled. The air having a reduced temperature is discharged from exhaust port 7.

In accordance with the progress of drying operation, the humidity of the washing-tub-inside-air is reduced by the influx of outside-air into washing tub 1 and the enthalpy of the washing-tub-inside-air is reduced. Therefore, the air volume of outside-air required to cool the temperature of the exhaust air flowing out of exhaust port 7 to a predetermined temperature or less can be reduced. Consequently, in accordance with the progress of the drying state, the air volume of the outside-air into mixing section 13 can be reduced, the corresponding amount can be assigned to the side of washing-tub-inside-air path 15 to increase the air volume into washing tub 1 to thus enhance the performance for drying objects to be washed. Then, by the air entering the side of washing-tub-inside-air path 15 in accordance with the operation of air blower 6, the humidity or temperature in washing tub 1 is lowered, and the blowing air volume of air blower 6 is further increased so as to increase the opening degree of washing tub damper 201. Accordingly, the opening degree at the side of outside-air path 14 is reduced by outside-air damper 202 that is connected and integrated with washing tub damper 201, thereby changing the volume ratio of the outside-air and the washing-tub-inside-air. The ratio of air volume to the side of washing-tub-inside-air path 15 is increased so as to promote drying.

Furthermore, when the humidity or temperature in washing tub 1 is reduced and the air in washing tub 1 may be discharged from exhaust port 7 without cooling it, the blowing air volume of air blower 6 is increased. That is to say, as shown in FIG. 4, the opening degree of washing tub damper 201 is fully opened and outside-air damper 202 is fully closed, and the air volume ratio of the outside-air to the washing-tub-inside-air is changed to about 0:1, so that the air blown from air blower 6 is mainly directed toward drying.

In this way, by the operation of changing the opening degree of damper 20 formed by integrating washing tub damper 201 and outside-air damper 202, the blowing air volume of one air blower 6 can be changed, and the air volume distribution into washing-tub-inside-air path 15 and outside-air path 14 can be carried out stably. The air volume ratio of the outside-air to the washing-tub-inside-air (outside-air volume: washing-tub-inside-air volume) can be changed from about 1:0 to about 0:1. Air blower 6 having small performance can be effectively used from cooling to drying. Thus, the power consumption and the cost can be reduced.

Therefore, hot air feeling of the exhaust air temperature is reliably prevented by promoting the cooling by mixing outside-air into washing-tub-inside-air in mixing section 13 and changing the air volume distribution. Furthermore, the increase in humidity in space such as a room is minimized by reducing the moisture content existing in the washing-tub-inside-air as dew condensation generated when the washing-tub-inside-air is cooled. Thus, the comfort can be improved. Furthermore, since the air volume distribution is made to be changeable, high-temperature air can be prevented from being exhausted and the drying performance can be secured.

Furthermore, since damper 20 is in a connection posture in which the opening degree of outside-air damper 202 is reduced when the opening degree of washing tub damper 201 is increased, blowing air volume of air blower 6 can be changed and the ratio of air volume in mixing section 13 can be significantly changed. Thereby, without increasing the air blowing ability of air blower 6, the air volume for drying can be increased by air blower 6 having small performance so as to improve the drying performance. Thus, the size of the air blower, the power consumption, and the cost can be reduced.

Furthermore, damper 20 is configured to return to the initial position by gravity when air blowing by air blower 6 is stopped. Therefore, the configuration can be simplified and the cost can be reduced.

Furthermore, damper 20 may have a configuration in which a return force is applied to damper 20 by an urging member such as a spring (not shown) so that damper 20 returns to the initial position by the urging member when air blowing by air blower 6 is stopped. Thus, the balance between the wind pressure and the return force can be set clearly, the opening degree position of damper 20 can be set reliably so as to secure the reliability of the operation, and the degree of freedom of the setting posture of air volume distribution section 12 can be enhanced.

In the above description, the case in which drying is carried out by utilizing remaining heat of objects to be washed during rinsing operation, without operating heater 5 during drying operation is described. However, it is needless to say that the outside-air flown into washing tub 1 from inlet port 10 is heated by operating heater 5 during drying operation so as to promote drying. At this time, as the wind speed in the vicinity of heater 5 is kept high, the output from heater 5 can be increased and drying performance can be improved. Thus, by increasing the volume of air for drying by utilizing the air volume ratio of outside-air to washing-tub-inside-air (outside-air volume: washing-tub-inside-air volume) of about 0:1, the drying time can be shortened or drying performance can be further improved.

FIG. 5 shows another embodiment of damper 20. Damper 20 is in a connection posture in which washing tub damper 201 and outside-air damper 202 are connected to each other so that they are closed when air blowing by air blower 6 is stopped.

Furthermore, in damper 20, washing tub damper 201 and outside-air damper 202 have different shapes of pressure receiving sections 29 against which a flow in the upstream collides. Pressure receiving section 29 of washing tub damper 201 is provided with concave surface 30 toward the upstream side, so that it can receive a pressure of flow more easily than outside-air damper 202. On the other hand, pressure receiving section 29 of outside-air damper 202 is provided with convex surface 31 toward the upstream side, so that it can receive a pressure less easily than washing tub damper 201.

Next, operations and effects of the thus configured damper 20 of air volume distribution section 12 are described.

When blowing air hits damper 20 by the start of operation of air blower 6, washing tub damper 201 having pressure receiving section 29 that is concave surface 30 toward the upstream side receives a fluid force of fluid easily. Furthermore, outside-air damper 202 having pressure receiving section 29 that is convex surface 31 toward the upstream side receives a fluid force of fluid less easily. Therefore, damper 20 rotates counterclockwise around support shaft 21 as a rotation center. As shown in FIG. 6, the opening degree is set at a balanced position between the fluid force and the return force by weight 204 of washing tub damper 201.

The air volume distribution into outside-air path 14 and washing-tub-inside-air path 15 is set as follows by providing a narrower portion (not shown) having a reduced cross-sectional area in the side of outside-air path 14 to set a large path resistance. That is to say, when the blowing air volume of air blower 6 is small and the opening degree of damper 20 is small, the air volume distribution is not affected by the path resistance in the side of outside-air path 14 and it can be determined by the passing resistance of damper 20. That is to say, the passing resistance of outside-air damper 202 having pressure receiving section 29 that is convex surface 31 toward the upstream side is reduced. In FIG. 6, a blanked arrow shows the air volume distribution into the side of outside-air path 14 and a black arrow shows the air volume distribution into the side of washing-tub-inside-air path 15. Thus, the air volume in the side of outside-air path 14 becomes larger than the air volume in the side of washing-tub-inside-air path 15, and the stable distribution of air volume, which is mainly directed to reducing the temperature of the exhaust air flown out of exhaust port 7, is carried out.

As the air volume of air blower 6 is further increased from this state, the opening degree of damper 20 is increased. The air volume flowing into the side of outside-air path 14 is affected by the path resistance of a narrower portion (not shown) having a reduced cross-sectional area, so that the increase of the air volume is not further increased. Then, the increase of the air volume in the side of washing-tub-inside-air path 15 exceeds that in the side of outside-air path 14, and the air volume ratio of the side of outside-air path 14 to the side of washing-tub-inside-air path 15 is shifted to a state in which the air volume of the side of washing-tub-inside-air path 15 is larger. Thus, stable air volume distribution directed mainly to drying is carried out.

Herein, in the connection posture of damper 20, washing tub damper 201 and outside-air damper 202 close washing-tub-inside-air path 15 and outside-air path 14, respectively when the operation of air blower 6 is stopped. Thus, the reliability of the equipment can be improved by preventing that moisture inside washing tub 1 flows back to the side of air blower 6 along the air blowing path and leaks out as dew condensation to corrode the equipment when the equipment is not operated.

Furthermore, the shape of pressure receiving section 29 of washing tub damper 201 is made to be different from that of outside-air damper 202. Therefore, even when the pressure-receiving areas of washing tub damper 201 and outside-air damper 202 of damper 20 are close to each other, the difference in the force applied in order to open/close damper 20 is clarified and the rotation force on support shaft 21 is stabilized. Thus, the reliable opening operation can be carried out, and the reliability of cooling operation of the exhaust air temperature and the drying operation can be improved.

Furthermore, since pressure receiving section 29 of washing tub damper 201 is provided with concave surface 30 toward the upstream side so as to receive a pressure more easily than outside-air damper 202, even when the pressure-receiving area of washing tub damper 201 is made to be smaller, the opening degree setting force of washing tub damper 201 can be secured. Thus, the reliable opening operation of entire damper 20 can be carried out, so that the size reduction of damper 20 can be promoted by reducing the pressure-receiving area.

Furthermore, since pressure receiving section 29 of outside-air damper 202 is provided with convex surface 31 toward the upstream side so as to receive a pressure less easily than washing tub damper 201, the opening degree setting force of washing tub damper 201 is secured and thus, the reliable opening operation of the entire damper 20 can be carried out. Therefore, the path resistance in outside-air damper 202 is reduced, and the size of air blower 6 can be reduced.

Furthermore, pressure receiving section 29 of washing tub damper 201 is provided with concave surface 30 toward the upstream side, and pressure receiving section 29 of outside-air damper 202 is provided with convex surface 31 toward the upstream side. Thereby, the air volume distribution of damper 20 is stabilized, and the stability of the exhaust air temperature can be improved. Thus, the size of damper 20 is reduced, and the flow resistance of the air path is reduced to decrease air blow load. Thus, the size and the cost of air blower 6 can be reduced.

When the pressure-receiving areas of pressure receiving sections 29 of washing tub damper 201 and that of outside-air damper 202 are made to be substantially the same as mentioned above, both outside-air path 14 and washing-tub-inside-air path 15 can set an air flowing path having a large sectional area. Therefore, the flow resistance in the air flowing path can be reduced and the size of the air blower can be reduced.

Furthermore, when the pressure-receiving area of washing tub damper 201 is made to be larger than that of outside-air damper 202, the force applied in order to open and close damper 20 is made to be clearly different between washing tub damper 201 and outside-air damper 202, and damper 20 can be operated in the direction in which washing tub damper 201 receives a pressure. Thus, even when a wind pressure is low, the opening degree of washing tub damper 201 can be set reliably, and load of air blower 6 can be decreased, thereby reducing the size of air blower 6.

Needless to say, washing tub damper 201 and outside-air damper 202 are produced respectively and then they may be connected to each other, or they may be formed of resin and the like as one unit from the first.

Furthermore, the case in which washing tub damper 201 and outside-air damper 202 share the same support shaft 21 is described. However, needless to say, washing tub damper 201 and outside-air damper 202 may be provided with an individual support shaft (not shown), respectively, and washing tub damper 201 and outside-air damper 202 may be integrated with each other via a connector (not shown).

Furthermore, air volume distribution can be carried out by changing the air volume of air blower 6 depending upon the passage of time of drying operation, without depending upon the detected temperature by control temperature detection section 18, when the air volume of air blower 6 during drying operation is controlled. Therefore, the cost can be reduced because temperature detection section 18 is not needed.

As mentioned above, in this embodiment, the air volume distribution section has a damper, whose opening degree is changed by a wind pressure, in a washing-tub-inside-air path and an outside-air path, and a washing tub damper provided in the washing-tub-inside-air path and an outside-air damper provided in the outside-air path are connected to be integrated with each other. Thus, during drying operation, a sufficient amount of outside-air for cooling is mixed with high-temperature and high-humidity air in the washing tub (washing-tub-inside-air) in a mixing section. With the opening degree changing operation by the integrated damper, the blowing air volume can be changed, and stable distribution of the air volume into the washing-tub-inside-air path and the outside-air path can be carried. As a result, it is possible to achieve both the prevention of hot air feeling of exhaust air by cooling the exhaust air and reducing moisture content and the improvement of drying performance. Furthermore, it is possible to improve the stability of exhaust air temperature.

Furthermore, the damper of this embodiment is in a connection posture in which when the opening degree of the washing tub damper is increased, the opening degree of the outside-air damper is reduced, so that blowing air volume can be changed and the volume air ratio in the mixing section can be significantly changed. Thus, without increasing the air blowing ability of the air blower, the air volume for drying can be increased so as to improve the drying performance. Thus, the size of the air blower, the power consumption, and the cost can be reduced.

Furthermore, the damper of this embodiment is in a connection posture in which the washing tub damper and the outside-air damper are closed when air blowing is stopped. Thus, the reliability of the equipment can be improved by preventing that moisture inside the washing tub flows back to the side of the air blower along the air blowing path and leaks out to corrode the equipment when the equipment is not operated.

Furthermore, since the damper of this embodiment is configured to return to the initial position by gravity when the air blowing is stopped, the configuration can be simplified and the cost can be reduced.

Furthermore, since the damper of this embodiment is configured to return to the initial position by an urging member when air blowing is stopped, the opening degree position of the damper can be set reliably, and the reliability of the operation can be secured.

Furthermore, in the damper of this embodiment, since a pressure-receiving area of the washing tub damper is made to be larger than that of the outside-air damper, the difference of the force applied in order to open and close the damper is clarified; the opening degree of the washing tub damper can be set reliably even when a wind pressure is low; and the load of the air blower can be decreased and the size of the air blower can be reduced.

Furthermore, in the damper of this embodiment, since the pressure-receiving area of the washing tub damper is made to be substantially the same as that of the outside-air damper, an air flowing path having a large cross-sectional area can be set. The flow resistance in the air flowing path is reduced, so that the size of the air blower can be reduced.

Furthermore, in the damper of this embodiment, the shape of the pressure receiving section of the washing tub damper is made to be different from that of the outside-air damper. Thereby, the difference of the force applied in order to open and close the damper is clarified even when the pressure-receiving areas of the dampers are close and the reliable opening operation can be carried out. Thus, the reliability of the cooling operation of the exhaust air temperature and the drying operation can be improved.

Furthermore, in the damper of this embodiment, a concave surface toward the upstream side in the pressure receiving section of the washing tub damper is provided so as to receive a pressure more easily than the outside-air damper. Thereby, even when the pressure-receiving area of the washing tub damper is made to be small, the opening degree setting force of the washing tub damper can be secured and reliable opening operation of the entire damper is possible, and the size reduction of the damper can be promoted.

Furthermore, in the damper of this embodiment, a convex surface toward the upstream side in the pressure receiving section of the outside-air damper is provided so as to receive a pressure less easily than the washing tub damper. Thereby, the opening degree setting force of the washing tub damper can be secured, and reliable opening operation of the entire damper is possible. Thus, the path resistance in the outside-air damper is reduced, and the size of the air blower can be reduced.

Second Embodiment

Figure 7:
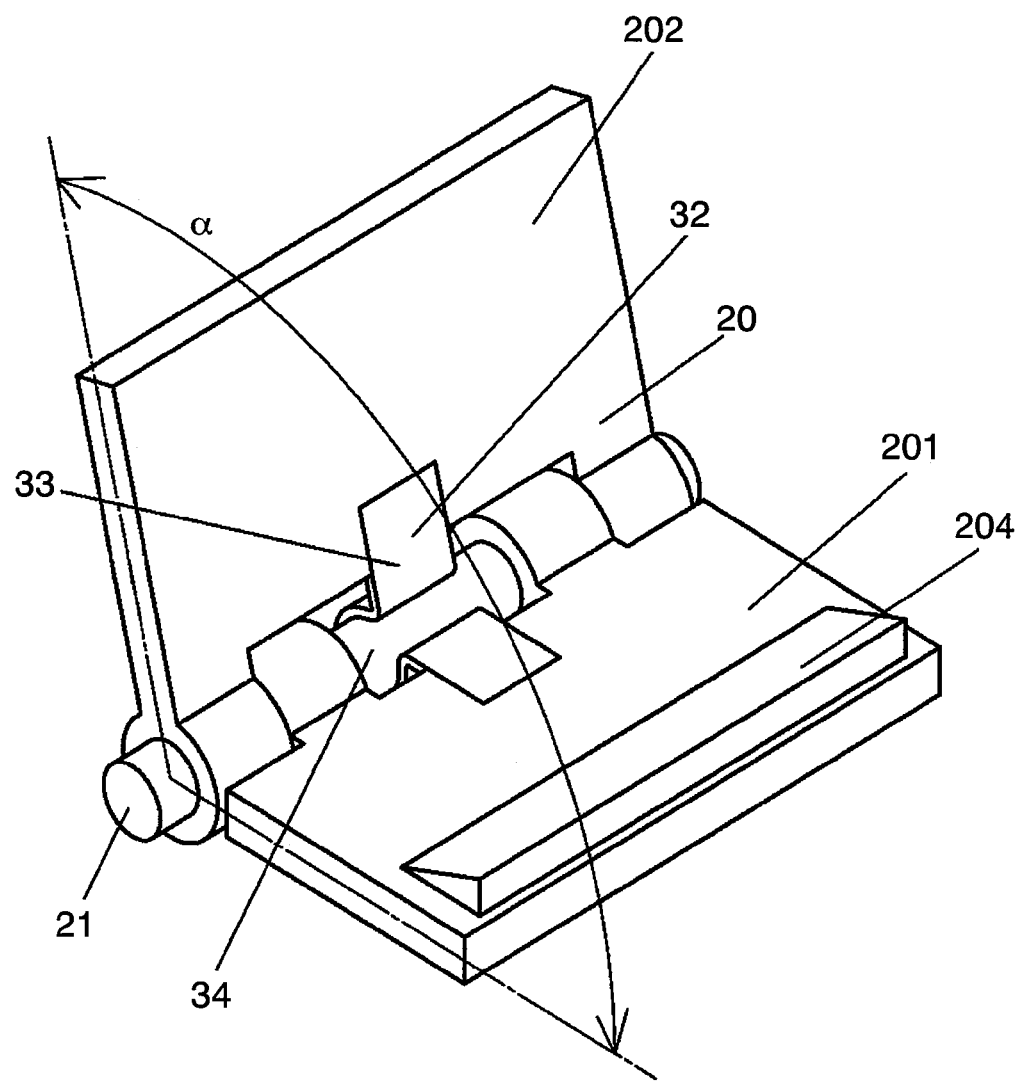
FIG. 7 is an outward perspective view showing a dish washer/dryer in accordance with a second embodiment of the present invention.
Figure 8:
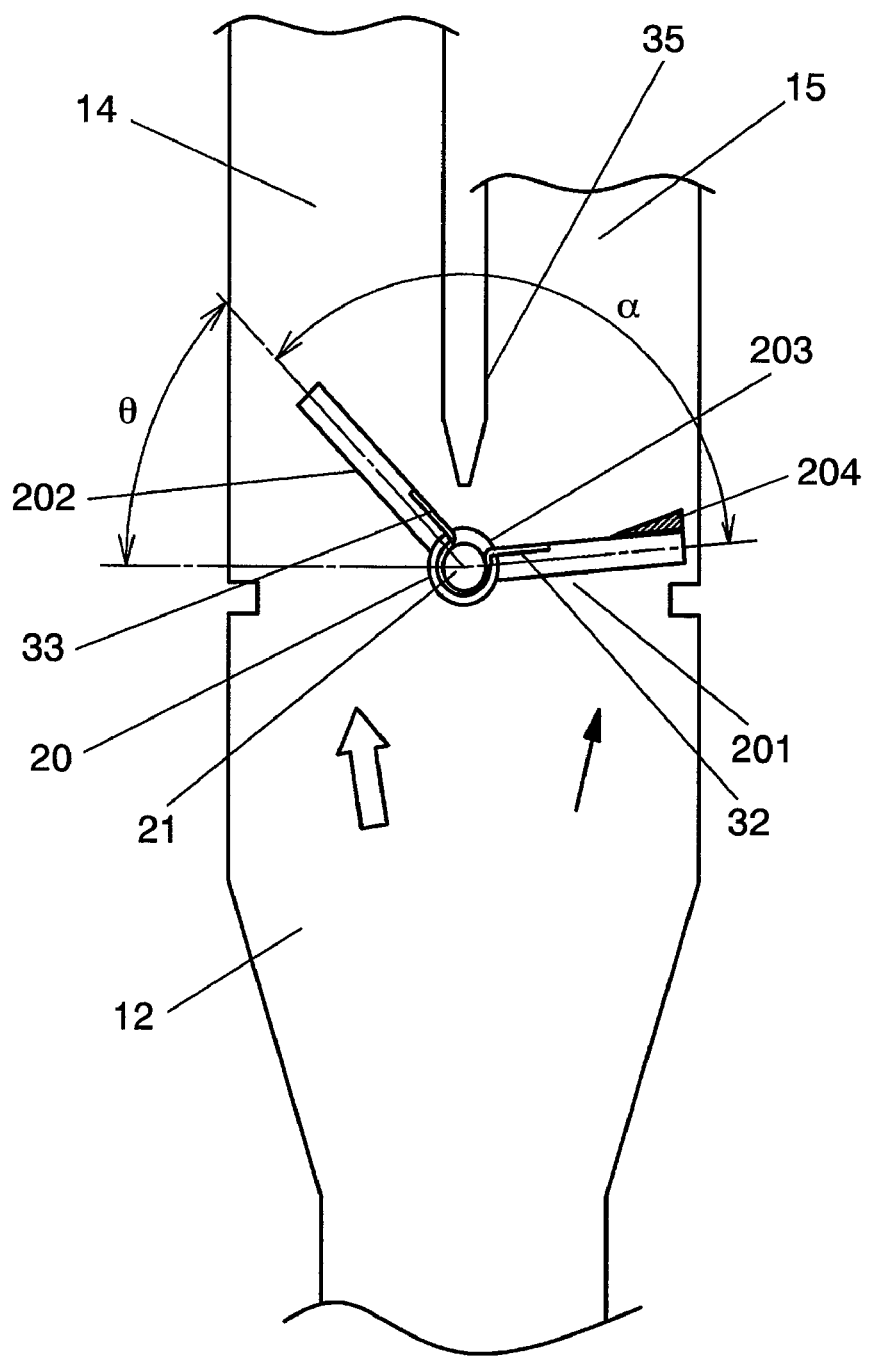
FIG. 8 is a sectional view showing an air volume distribution section of the dish washer/dryer in accordance with the second embodiment of the present invention.
Figure 9:
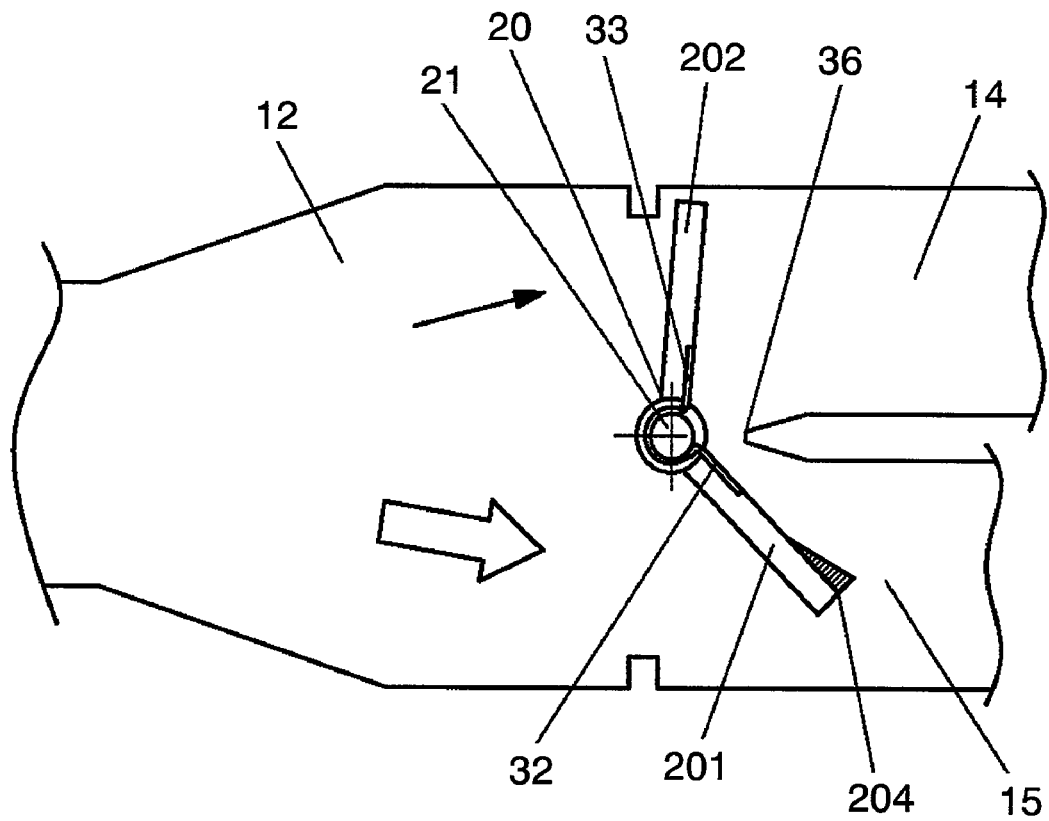
FIG. 9 is a sectional view showing another configuration of the air volume distribution section of the dish washer/dryer in accordance with the second embodiment of the present invention.
Figure 10:
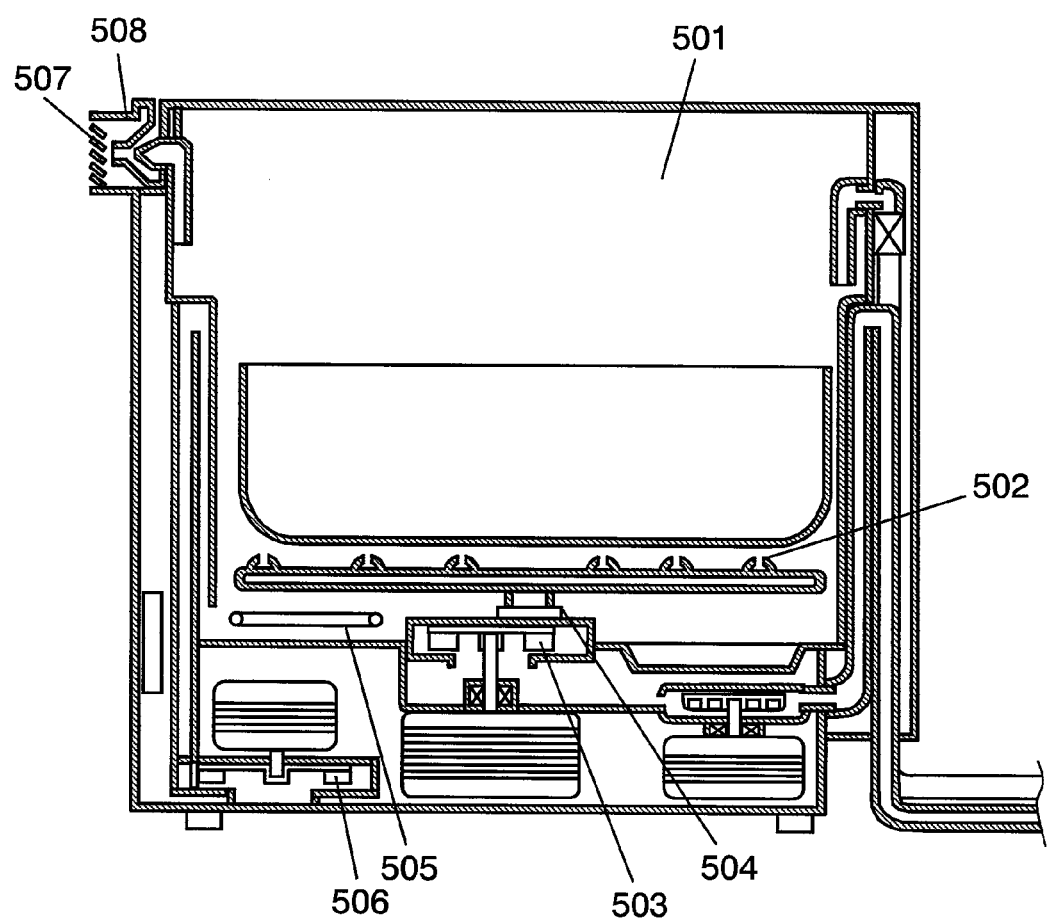
FIG. 10 is a view showing a configuration of a conventional dish washer/dryer.

FIG. 7 is an outward perspective view showing a dish washer/dryer in accordance with a second embodiment of the present invention. FIG. 8 is a sectional view showing an air volume distribution section of the dish washer/dryer in accordance with the second embodiment of the present invention. FIG. 9 is a sectional view showing another configuration of the air volume distribution section of the dish washer/dryer in accordance with the second embodiment of the present invention.

In FIGS. 7 to 9, the same reference numerals are given to the same members and the same functions as those in the first embodiment shown in FIGS. 1 to 6 and the description thereof is omitted. The different things are particularly described.

In FIG. 7, damper 20 has posture setting section 32 capable of changing a connection posture of washing tub damper 201 and outside-air damper 202. By changing connection angle α made by washing tub damper 201 and outside-air damper 202, relative positions of washing tub damper 201 and outside-air damper 202 can be changed.

Posture setting section 32 is configured to change the connection posture in accordance with the temperature in washing tub 1 by using shape memory member 33. Support shaft 21 of damper 20 is installed on a wall surface (not shown), which is made of a material having an excellent thermal conductivity, for example, copper, stainless steel, and the like, and which forms washing tub 1. A cylindrical surface of support shaft 21 is heat transfer section 34 that transfers the temperature of the washing tub, and the middle portion of shape memory member 33, which is coupled to washing tub damper 201 at one end and to outside-air damper 202 at the other end, is disposed around heat transfer section 34 in a heat transfer relation.

Herein, washing tub damper 201 and outside-air damper 202 are connected like a hinge to each other via support shaft 21. The relative position thereof is defined by determining the connection angle by shape memory member 33 as posture setting section 32.

Furthermore, shape memory member 33 can be coupled to washing tub damper 201 and outside-air damper 202, respectively, by various methods such as adhesive-bonding, welding, engaging, caulking, or the like.

Next, operations and effects of the thus configured damper 20 of air volume distribution section 12 are described with reference to FIG. 8.

In order to prevent high-temperature and high-humidity air in washing tub 1 from being discharged from exhaust port 7 during drying operation in FIG. 1, the blowing air volume of blower 6 is reduced when drying operation is started and a low wind pressure is applied to air volume distribution section 12 as shown in FIG. 8. Then, air blowing is mainly directed to the side of outside-air path 14. Thereby, the air volume ratio of outside-air to washing-tub-inside-air (outside-air volume: washing-tub-inside-air volume) is set so that the air volume ratio in the side of the outside-air is larger. At this time, as the temperature at the time of rinsing is set to be higher (for example, 80° C.), the inside of washing tub 1 is in a state of high temperature and high humidity. Therefore, when the drying operation is started, it is necessary to increase the air volume ratio of the outside-air. On the contrary, when the temperature at the time of rinsing is reduced (for example, 60° C.), when the drying operation is started, by reducing the air volume ratio of outside-air so as to increase the volume of air for drying into washing tub 1 and to thus enhance the drying performance. Thus, the air volume of air blower 6 can be effectively used.

Therefore, the temperature in washing tub 1 is transferred to shape memory member 33 via support shaft 21 of damper 20, and connection angle α made by washing tub damper 201 and outside-air damper 202 is changed.

That is to say, when the temperature in washing tub 1 is high, by reducing connection angle α, opening angle θ at the side of outside-air path 14 by outside-air damper 202 is increased. Thus the ratio of volume of air flowing into the side of outside-air path 14 is increased. Furthermore, when the temperature in washing tub 1 is low, by increasing connection angle α, opening angle θ at the side of outside-air path 14 by outside-air damper 202 is reduced. Thus the ratio of air volume flowing into the side of outside-air path 14 is reduced.

FIG. 8 shows a state in which washing tub damper 201 is somewhat opened by a wind pressure of air blower 6. Even when the opening degree of washing tub damper 201 is the same, connection angle α is small when the temperature in washing tub 1 is high. Therefore, opening angle θ of outside-air damper 202 is increased so as to enhance the effect of reducing the temperature of exhaust air. On the other hand, when the temperature in washing tub 1 is reduced, connection angle α becomes large and opening angle θ of outside-air damper 202 is made to be small. Accordingly, the effect of reducing the temperature of exhaust air is weakened and the ratio of air volume to the side of washing-tub-inside-air path 15 is increased so as to enhance the drying performance. Thereby, the control range of reducing exhaust air temperature is expanded.

Furthermore, connection angle α of damper 20 is changed corresponding not only to the setting in the initial state when the drying operation is started but also to temperature reduction of washing tub 1 accompanying the progress of the drying operation. Thus, the operation for enhancing the drying performance is carried out by distributing the air volume to the side of washing-tub-inside-air path 15 as much as possible while preventing hot air from being discharged from exhaust port 7. Thus, both the expansion of the control range of exhaust air temperature and the improvement of the drying performance can be achieved.

Thus, damper 20 has posture setting section 32 capable of changing the connection posture of connector 203 of washing tub damper 201 and outside-air damper 202. Thus, the case, in which the temperature in washing tub 1 is high, can also reduce its exhaust air temperature as well as the case, in which the temperature in washing tub 1 is low, so that the control range of the exhaust air temperature can be expanded. As a result, it is possible to carry out a setting of a posture selected from a setting for mainly reducing the exhaust air temperature and a setting for mainly enhancing the drying performance. Thus, the operability can be enhanced and convenience can be improved.

Furthermore, since posture setting section 32 changes the connection posture in accordance with the temperature in washing tub 1, the exhaust air temperature can be reduced reliably by setting the air volume distribution ratio depending upon the temperature in washing tub 1 so as to promote the temperature reduction of exhaust air.

Furthermore, posture setting section 32 includes shape memory member 33 that changes its shape in accordance with the temperature. Thus, the configuration can be simplified and the cost can be reduced.

Furthermore, posture setting section 32 includes heat transfer section 34, which is provided at support shaft 21 of damper 20 and transfers the temperature in washing tub 1, and shape memory member 33 coupled to washing tub damper 201 and outside-air damper 202, in a way in which they are disposed in a heat transfer relation with each other. Thus, a posture of damper 20 is set reliably by shape memory member 33 in accordance with the temperature in washing tub 1, and the reliability of the operation for reducing the exhaust air temperature can be improved.

Herein, the case in which connection angle α of damper 20 is changed by using shape memory member 33 as posture setting section 32 is described. However, instead of using shape memory member 33, washing tub damper 201 and outside-air damper 202 are attached to support shaft 21 in a way in which they are press-fit into support shaft 21 and connection angle α may be set by moving it manually. Furthermore, washing tub damper 201 and outside-air damper 202 are combined with each other via ratchet multi-step (not shown) and connection angle α can be set manually. Furthermore, needless to say, an actuator (not shown) such as a motor for moving connection angle α made by washing tub damper 201 and outside-air damper 202 may be provided so as to control connection angle α in accordance with the temperature in washing tub 1.

Furthermore, as shown in FIG. 8, the air is allowed to flow upwardly from air blower 6. Damper 20 is disposed at vertical branching section 35 that substantially vertically branches into outside-air path 14 and washing-tub-inside-air path 15, and support shaft 21 of damper 20 is provided in the substantially vertical direction of vertical branching section 35. Thereby, the return operation of damper 20 by gravity can be stabilized so as to enhance the certainty of the return operation of the damper when the blowing air volume is reduced. Thus, the operation reliability can be improved.

FIG. 9 shows another example of air volume distribution section 12. In FIG. 9, damper 20 is disposed at horizontal branching section 36 that substantially horizontally branches into outside-air path 14 and washing-tub-inside-air path 15, and washing-tub-inside-air path 15 is disposed below outside-air path 14. Support shaft 21 of damper 20 is provided in the substantially horizontal direction of horizontal branching section 36. Thus, the air volume of air blower 6 is increased and the opening degree in the side of washing-tub-inside-air path 15 by washing tub damper 201 becomes larger. FIG. 9 shows the state in which the air volume in the side of washing-tub-inside-air path 15 (shown by a blanked arrow in the drawing) is made to be larger than the air volume in the side of outside-air path 14 (shown by a black arrow in the drawing) and operation is carried out mainly for drying. From this state, when air blower 6 is stopped and the drying operation is terminated, even when damper 20 is not provided with weight 204, a rotation force in the clockwise direction in this drawing works by its own weight of washing tub damper 201 and outside-air damper 202, so that the damper returns to the state in which washing tub damper 201 in the side of washing-tub-inside-air path 15 is closed.

In this way, even when damper 20 is disposed at horizontal branching section 36 that substantially horizontally branches into washing-tub-inside-air path 15 and outside-air path 14, support shaft 21 of damper 20 is disposed substantially horizontally. Thus, even when damper 20 has a simple configuration in which it returns to the original state by its own weight, the certainty of returning operation of damper 20 when the blowing air volume is reduced can be enhanced and the operation reliability can be improved.

Furthermore, by disposing washing-tub-inside-air path 15 below outside-air path 14, damper 20 can be configured to return to the original state by its own weight. Therefore, the configuration can be simplified and thus the cost can be reduced.

Note here that in FIG. 9, an example in which outside-air path 14 and washing-tub-inside-air path 15 are disposed in the upper and lower direction is described. However, it is needless to say that they can be disposed in the front and back direction in this paper of FIG. 9.

As mentioned above, in the second embodiment, the damper has a posture setting section capable of changing a connection posture of a washing tub damper and an outside-air damper, thereby enabling the control range of the exhaust air temperature to be expanded. Thus, it is possible to carry out a setting of a posture selected from a setting for mainly reducing the temperature of exhaust air and a setting for mainly enhancing the drying performance, and the like. Consequently, the operability can be enhanced and the convenience can be improved.

Furthermore, the posture setting section of this embodiment changes its connection posture in accordance with a temperature of the washing tub. By setting the air volume ratio in accordance with a temperature of the washing tub, the temperature of exhaust air can be reliably reduced. Thus, the reduction of the exhaust air temperature can be promoted.

Furthermore, the posture setting section of this embodiment includes a shape memory member that changes its shape in accordance with the temperature. Thus, the configuration can be simplified and the cost can be reduced.

Furthermore, the posture setting section of this embodiment includes the heat transfer section provided at a support shaft of the damper and transferring a temperature of the washing tub, and the shape memory member coupled to the washing tub damper and the outside-air damper, in a way in which they are disposed in a heat transfer relation with each other. Thus, the posture of the damper is set reliably by the shape memory member in accordance with the temperature in the washing tub, and the reliability of the operation for reducing the exhaust air temperature can be improved.

Furthermore, the damper of this embodiment is disposed at a vertical branching section that substantially vertically branches into the washing-tub-inside-air path and the outside-air path, and a support shaft of the damper is provided in the substantially vertical direction of the vertical branching section. Thus, the certainty of a return operation of the damper when the blowing air volume is reduced can be enhanced, and the operation reliability can be improved.

Furthermore, the damper of this embodiment is disposed at a horizontal branching section that substantially horizontally branches into the washing-tub-inside-air path and the outside-air path, and the support shaft of the damper is provided in the substantially horizontal direction of the horizontal branching section. Thus, the certainty of the return operation of the damper when the blowing air volume is reduced can be enhanced, and the operation reliability can be improved.

Furthermore, in the horizontal branching section of this embodiment, the washing-tub-inside-air path is disposed below the outside-air path. Thereby, the damper can return to the original position by its own weight, and the configuration can be simplified, so that the cost can be reduced.

Finally, the effects of the dish washer/dryer of the present invention are summarized. As is apparent from the above description, the following effects can be obtained.

A dish washer/dryer of the present invention includes a washing tub for accommodating an object to be washed, a washing section for washing the object to be washed, and a heater for heating washing water. Furthermore, the dish washer/dryer includes an exhaust port for discharging moisture inside the washing tub, an air blower for blowing outside-air, a mixing section disposed at an upstream side of the exhaust port and mixing outside-air and washing-tub-inside-air with each other, and an air volume distribution section for changing a feeding ratio of outside-air into the washing tub and the mixing section. With this configuration, during drying operation, a sufficient amount outside-air for cooling is mixed with high-temperature and high-humidity air in the washing tube (washing-tub-inside-air) in the mixing section. With the operation of changing the opening degree by the air volume distribution section, the blowing air volume can be changed and stable distribution of air volume into the washing-tub-inside-air path and the outside-air path can be carried out. As a result, it is possible to achieve both the prevention of hot air feeling of exhaust air by cooling the exhaust air and reducing moisture content and the improvement of drying performance. Furthermore, it is possible to improve the stability of exhaust air temperature.

Furthermore, in particular, when the air volume distribution section has a configuration in which a damper whose opening degree is changed by a wind pressure is provided in the washing-tub-inside-air path and the outside-air path, and the washing tub damper provided in the washing-tub-inside-air path and the outside-air damper provided in the outside-air path are connected to be integrated with each other, the following effects can be achieved. During drying operation, a sufficient amount outside-air for cooling is mixed with high-temperature and high-humidity air in the washing tube (washing-tub-inside-air) in the mixing section. With the operation for changing the opening degree of the integrated damper, the blowing air volume is changed and the stable air volume distribution to the washing-tub-inside-air path and the outside-air path is carried out. As a result, it is possible to achieve both the prevention of hot air feeling of exhaust air by cooling the exhaust air and reducing moisture content and the improvement of drying performance. Furthermore, it is possible to improve the stability of exhaust air temperature.

Furthermore, in particular, in the configuration having a connection in which when the opening degree of the washing tub damper is increased, the opening degree of the outside-air damper is reduced, the following effects can be achieved. The blowing air volume can be changed, and the volume air ratio in the mixing section can be significantly changed. Thereby, without increasing the air blowing ability of the air blower, the air volume for drying can be increased so as to improve the drying performance. Thus, the size of the air blower, the power consumption, and the cost can be reduced.

Furthermore, in particular, in the configuration having a connection posture in which the washing tub damper and the outside-air damper are closed when air blowing is stopped, the following effects can be achieved. The reliability of the equipment can be improved by preventing that moisture inside the washing tub flows back to the side of the air blower along the air blowing path and leaks out to corrode the equipment when the equipment is not operated.

Furthermore, in particular, when the damper is configured to return to the initial position by gravity when the air blowing is stopped, the configuration can be simplified and the cost can be reduced.

Furthermore, in particular, in the configuration in which the damper is configured to return to the initial position by an urging member when air blowing is stopped, the opening degree position of the damper can be set reliably, and the reliability of the operation can be secured.

Furthermore, in particular, when a posture setting section capable of changing the connection posture of the washing tub damper and the outside-air damper is disposed, the control range of the exhaust air temperature can be expanded. Thus, it is possible to carry out a setting of a posture selected from a setting for mainly reducing the exhaust air temperature and a setting for mainly enhancing the drying performance. Thus, the operability can be enhanced and convenience can be improved.

Furthermore, in particular, in the configuration in which the posture setting section changes its connection posture in accordance with the temperature of the washing tub, by setting the air volume distribution ratio in accordance with the temperature of the washing tub, the exhaust air temperature can be reliably reduced and the reduction of exhaust air temperature can be promoted.

Furthermore, in particular, when the posture setting section includes a shape memory member that changes its shape in accordance with a temperature, the configuration can be simplified and the cost can be reduced.

Furthermore, in particular, the posture setting section can include a heat transfer section provided at the support shaft of the damper and transferring the temperature in the washing tub, and the shape memory member coupled to the washing tub damper and the outside-air damper, in a way in which they are disposed in a heat transfer relation with each other. In this structure, the posture of the damper is set reliably by the shape memory member in accordance with the temperature in the washing tub, and the reliability of the operation for reducing the exhaust air temperature can be improved.

Furthermore, in particular, when a pressure-receiving area of the washing tub damper is made to be larger than that of the outside-air damper, the difference of the force applied in order to open and close the damper is clarified; the opening degree of the washing tub damper can be set reliably even when a wind pressure is low; and the load of the air blower can be reduced and the size of the air blower can be reduced.

Furthermore, in particular, when the pressure-receiving area of the washing tub damper is made to be substantially the same as that of the outside-air damper, the air flowing path having a large cross-sectional area can be set. The flow resistance in the air flowing path is reduced, and the size of the air blower can be reduced.

Furthermore, in particular, when the shape of the pressure receiving section of the washing tub damper is made to be different from that of the outside-air damper, the difference of the force applied in order to open and close the damper is clarified even when the pressure-receiving areas of the dampers are close, and a reliable opening operation can be carried out. Thus, the reliability of the cooling operation of the exhaust air temperature and the drying operation can be improved.

Furthermore, in particular, in the damper in which a concave surface toward the upstream side in the pressure receiving section of the washing tub damper is provided so as to receive a pressure more easily than the outside-air damper, even when the pressure-receiving area of the washing tub damper is made to be small, the opening degree setting force of the washing tub damper can be secured and reliable opening operation of the entire damper becomes possible, and the size reduction of the damper can be promoted.

Furthermore, in particular, in the damper in which a convex surface toward the upstream side in the pressure receiving section of the outside-air damper is provided so as to receive a pressure less easily than the washing tub damper, the opening degree setting force of the washing tub damper can be secured and reliable opening operation of the entire damper becomes possible. Furthermore, the path resistance in the outside-air damper is reduced, and the size of the air blower can be reduced.

Furthermore, in particular, when the damper is disposed at a vertical branching section that substantially vertically branches into the washing-tub-inside-air path and the outside-air path, and a support shaft of the damper is provided in the substantially vertical direction of the vertical branching section, the certainty of a return operation of the damper when the blowing air volume is reduced can be enhanced, and the operation reliability can be improved.

Furthermore, in particular, when the damper is disposed at a horizontal branching section that substantially horizontally branches into the washing-tub-inside-air path and the outside-air path, and the support shaft of the damper is provided in the substantially horizontal direction of the horizontal branching section, the certainty of a return operation of the damper when the blowing air volume is reduced can be enhanced, and the operation reliability can be improved.

Furthermore, in particular, in the horizontal branching section in which the washing-tub-inside-air path is disposed below the outside-air path, since the damper can return to the original position by its own weight, the configuration can be simplified, so that the cost can be reduced.

As mentioned above, a dish washer/dryer in accordance with the present invention is capable of preventing hot air feeling of an exhaust air temperature during drying, and also capable of cooing in accordance with high-temperature and high-humidity air conditions. Therefore, it can be applied to a household appliance such as a rice cooker that generates vapor, an electric water heater, and the like.

What is claimed is:

1. A dish washer/dryer comprising:
   a washing tub for accommodating an object to be washed;
   a washing section for washing the object to be washed;
   a heater for heating washing water;
   an exhaust port for discharging moisture inside the washing tub;
   an air blower for blowing outside-air;
   a mixing section disposed at an upstream side of the exhaust port, the mixing section mixing outside-air and washing-tub-inside-air with each other; and
   an air volume distribution section for changing a feeding ratio of the outside-air into the washing tub and the mixing section,
   wherein an outside-air path for introducing the outside-air into the mixing section and a washing-tub-inside-air path for communicating with the mixing section are disposed at a downstream side of the air volume distribution section,
   wherein the air volume distribution section has dampers in the washing-tub-inside-air path and the outside-air path, a washing tub damper provided in the washing-tub-inside-air path and an outside-air damper provided in the outside-air path are connected to be integrated with each other,
   wherein the dampers are connected in a freely rotatable manner to the air volume distribution section such that the opening degree of the washing tub damper is continuously increased according to an increase of a blowing air volume from the blower, and
   wherein the freely rotatable dampers are individually weighted so that the washing tub damper is biased toward the washing-tub-inside-air path such that upon deactivating the air blower the washing tub damper moves to close the washing-tub-inside-air path.

2. The dish washer/dryer of claim 1, wherein
   the dampers are in a connection posture in which the washing tub damper and the outside-air damper are closed when air blowing is stopped.

3. The dish washer/dryer of claim 1, wherein
   the dampers have a posture setting section capable of changing a connection posture of the washing tub damper and the outside-air damper.

4. The dish washer/dryer of claim 3, wherein
   the posture setting section changes the connection posture in accordance with a temperature of the washing tub.

5. The dish washer/dryer of claim 3, wherein
   the posture setting section includes a shape memory member that changes its shape in accordance with a temperature.

6. The dish washer/dryer of claim 5, wherein
   the posture setting section includes a heat transfer section provided at a support shaft of the damper and transferring a temperature of the washing tub, and the shape memory member coupled to the washing tub damper and the outside-air damper, in a way in which they are disposed in a heat transfer relation with each other.

7. The dish washer/dryer of claim 1, wherein
in the dampers, a pressure-receiving area of the washing tub damper is made to be larger than a pressure-receiving area of the outside-air damper.

8. The dish washer/dryer of claim 1, wherein
in the dampers, the pressure-receiving area of the washing tub damper is made to be same as the pressure-receiving area of the outside-air damper.

9. The dish washer/dryer of claim 1, wherein
in the dampers, a shape of the pressure-receiving section of the washing tub damper is made to be different from a shape of the pressure-receiving section of the outside-air damper.

10. The dish washer/dryer of claim 9, wherein
in the dampers, the pressure-receiving section of the washing tub damper is provided with a concave surface toward an upstream side, so that the washing tub damper receives a pressure more easily than the outside-air damper.

11. The dish washer/dryer of claim 9, wherein
in the dampers, the pressure-receiving section of the outside-air damper is provided with a convex surface toward an upstream side so that the outside-air damper receives a pressure less easily than the washing tub damper.

12. The dish washer/dryer of claim 1, wherein
the dampers are disposed at a vertical branching section that vertically branches into the washing-tub-inside-air path and the outside-air path, and a support shaft of the dampers is provided in a vertical direction of the vertical branching section.

13. The dish washer/dryer of claim 1, wherein
the dampers are disposed at a horizontal branching section that horizontally branches into the washing-tub-inside-air path and the outside-air path, and a support shaft of the dampers is provided in a horizontal direction of the horizontal branching section.

14. The dish washer/dryer of claim 13, wherein
in the horizontal branching section, the washing-tub-inside-air path is disposed below the outside-air path.

* * * * *

UNITED STATES PATENT AND TRADEMARK OFFICE
CERTIFICATE OF CORRECTION

| | | |
|---|---|---|
| PATENT NO. | : 8,231,737 B2 | |
| APPLICATION NO. | : 12/062942 | |
| DATED | : July 31, 2012 | |
| INVENTOR(S) | : Shigeru Iwanaga et al. | |

It is certified that error appears in the above-identified patent and that said Letters Patent is hereby corrected as shown below:

On the Title Page, Item [56], References Cited:

FOREIGN PATENT DOCUMENTS

"EP 1 721 599 A 11/2006"

should read

--EP 1 721 559 A 11/2006--

Signed and Sealed this
Eighteenth Day of December, 2012

David J. Kappos
*Director of the United States Patent and Trademark Office*